Dec. 13, 1949   J. L. BUDREAU   2,491,030
SKID LOADER
Filed Nov. 28, 1947   2 Sheets-Sheet 1
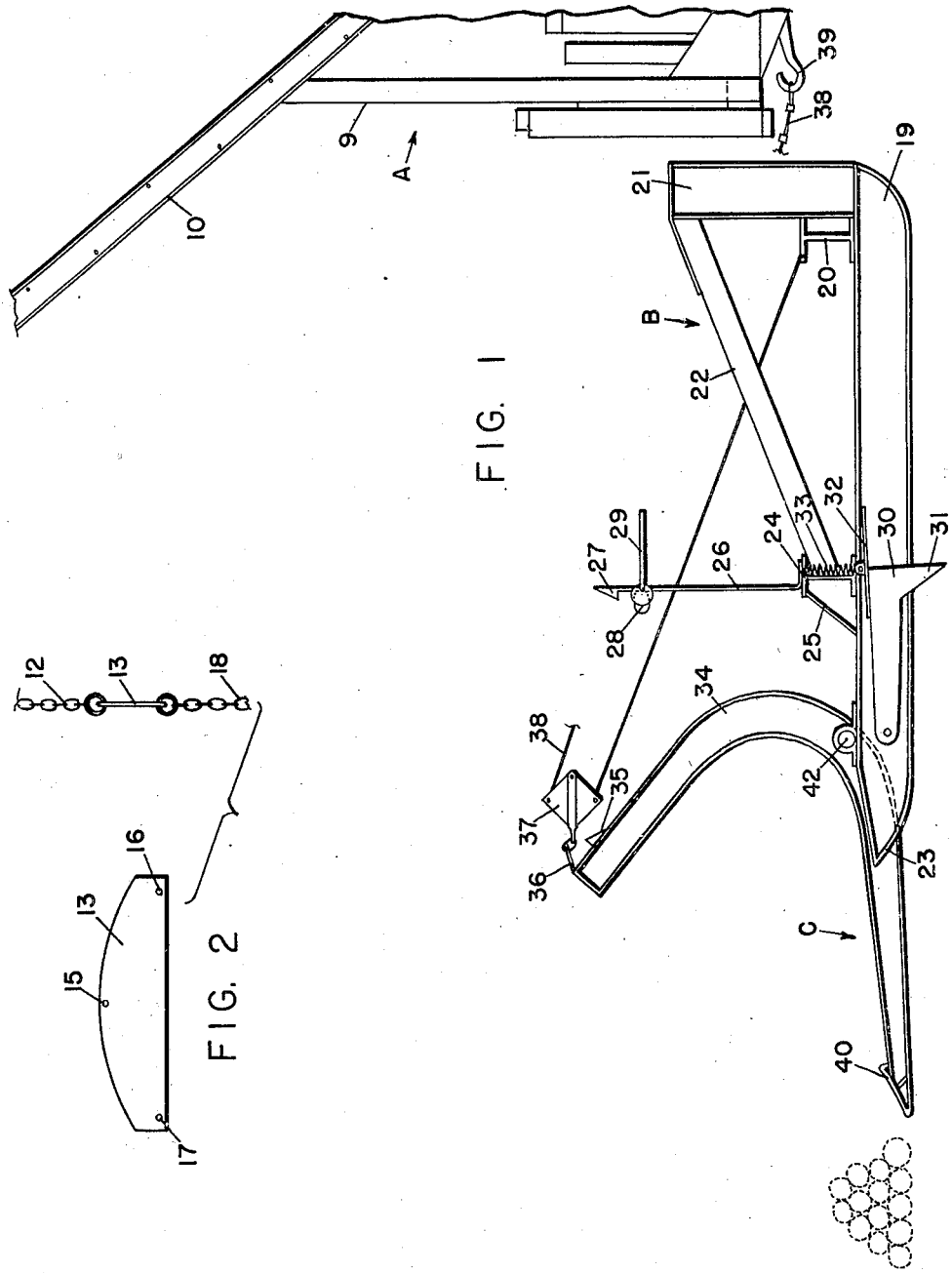
INVENTOR
JOHN L. BUDREAU
BY H. F. Woodward
Atty.

Dec. 13, 1949  J. L. BUDREAU  2,491,030
SKID LOADER

Filed Nov. 28, 1947  2 Sheets-Sheet 2

INVENTOR
JOHN L. BUDREAU
BY H. F. Woodward
Atty.

Patented Dec. 13, 1949

2,491,030

UNITED STATES PATENT OFFICE 2,491,030

SKID LOADER

John L. Budreau, Kenora, Ontario, Canada, assignor to Minnesota and Ontario Paper Company, Minneapolis, Minn.

Application November 28, 1947, Serial No. 788,340

3 Claims. (Cl. 214—140)

This invention relates to loading device and more particularly to a mechanism for loading of elongated elements of material such as logs, pulpwood and the like onto a conveying means such as a truck.

An object of the invention is to provide a pivotally mounted means that may be advanced under the material to be loaded to raise the material from the ground and then the material so raised is secured together so that the load may be moved to the place of the disposition, and then raised to the desired height and loaded into a truck or onto a storage space. While the apparatus as hereinafter described was designed for having such material as pulpwood, logs and the like, it may be used on other material.

With these and other objects in view, the invention consists in certain details of construction in combination and arrangements of parts, all as will hereinafter be more sufficiently described, but it is to be understood that they are here presented for an illustrative purpose only and are not to be accorded any interpretations such as might have the effect of limiting what is claimed as the invention short of its true and comprehensive scope in the art.

In the accompanying drawings,

Figure 1 is a side elevational view of the loader embodying the invention;

Figure 2 is a front elevational view of a spreader bar; and

Figure 3:
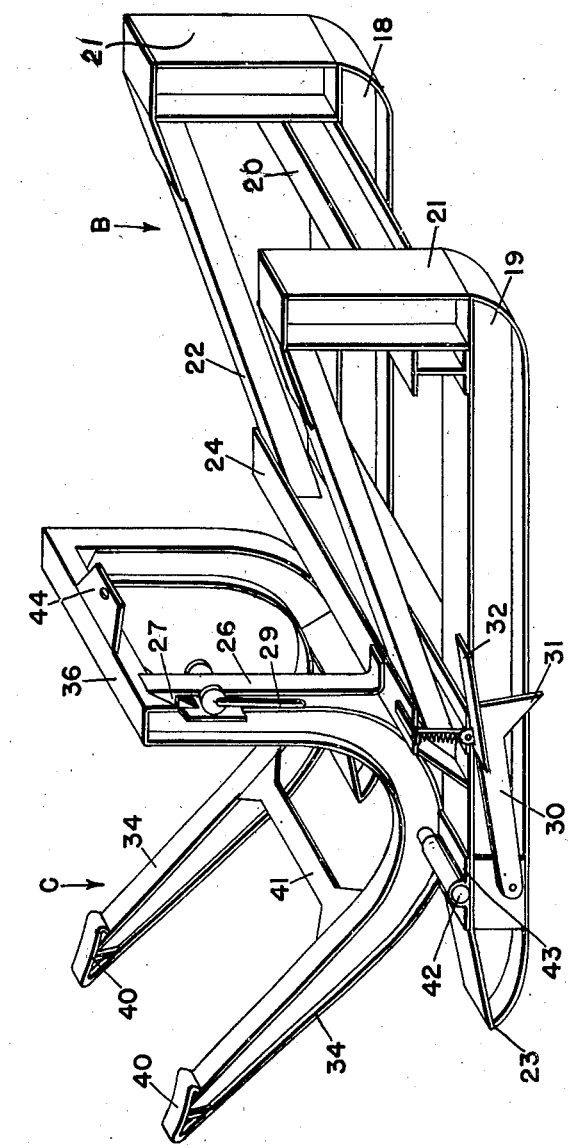
Figure 3 is a view of the loading apparatus with the loading arm in the raised position.

In Figure 1 is shown a tractor with a portion broken away and indicated generally at A; a sled-like portion B; and loading arms C. Secured to a suitable tractor such as a tractor of the caterpillar type is a frame which has a winch mounted thereon. The members secured to the tractor includes upright member 9 and member 10 extending from the tractor. To the upper end of this winch is secured chain member 12 and spreader bar member 13. Secured to the lower edge of the plate member 13 at 16 and 17 is bunch chain members 18.

A sled-like member B includes runners 19 which are secured together at their rear portion by member 20 and at the front edge by member 24. At the rear portion of the members 19 are upright members 21. These upright members are braced against the member 24 by suitable members 22. The member 24 is also braced at 25 and this arrangement provides a frame which will withstand rough usage. The front end of the members 19 is provided with a forward end shaped as shown at 23 Figure 1. Secured to member 24 and extending substantially vertically therefrom is member 26 which is provided with hook-like member 27 at the upper end and a cam member 28 which has attached thereto handle 29. This arrangement provides a locking means for the bunch arm members. Secured to the runners 19 are pivotally mounted members 30 which have secured thereto footpiece 32 and a penetrating point 31. For normally holding this member in the raised position there is provided a spring 33.

The movable loading arms 34 have secured thereon adjacent their upper edge member 35 which cooperates with latch member 27 in locking the arms in the raised position. The arms 34 of the loading member are secured together at the upper end by member 36. Member 36 is provided with a plate-like member 44, to which is secured block member 37. A line 38 is secured to member 20 and passes over the pulley block and is fastened to the tractor by means of a hook 39. The forward end of the loading arms 40 are shaped as shown in Figures 1 and 2 so that the elongated members, when loaded, have a tendency to stay on the arms and not roll therefrom. The arms 34 are secured together adjacent about their midsection by member 41, and this prevents the spreading of the arms during loading. The load arm C is pivotally secured to members 19 by shaft 42 and plate member 43.

In operation the loading arms are in the position shown in Figure 1, and a suitable tractor pushes the member B by contacting the upright members 21 and this forces the arms 34, for example, under a pile of pulpwood. After the arms are sufficiently extended under the pulpwood they are raised by the tractor pulling backward on line 38 and when they arrive in the upright position, latch 27 cooperates with member 35 on the arms locking the arms in the upright position. Before the arms are raised the foot brake is forced into the ground so that the sled member B does not move during raising. The bunch chains 18 are then placed around the load of pulpwood and then the winch raises the logs and places them on a tractor or other desired location.

What is claimed is:

1. A device for loading pulpwood and the like comprising parallel spaced apart substantially U-shaped arms pivotally mounted adjacent the forward end of parallel runners, said arms adapted to move through an arc of at least 30° from the loading to unloading position and vice versa, parallel runners which remain in ground contact during loading and unloading of the said arms, upright members positioned adjacent the ends of the runners opposed the end of the runners to which the arms are pivoted, cross-members securing the runners together, members secured to the upper portion of the upright members and extending downwardly to one of the cross-members securing the runners together, means for latching the arms in the upright position, and means for lowering and raising the arms.

2. A device of the character described comprising spaced parallel runners which remain in ground contact during loading and unloading, a pair of curved arms pivotally mounted adjacent one end of said parallel runners, spaced-apart cross members securing the runners together, upright members at the opposed end of the runners to which the arms are pivoted, members attached to the said upright members and extending downwardly therefrom to one of the said spaced-apart cross members connecting the runners together, a ground locking means secured to said runners and normally held in a raised position, latching means extending upwardly from one of the spaced-apart cross members, a cam-like member mounted adjacent the upper latching means and for releasing the latching means from the latched position, and means for raising and lowering the said arms.

3. A device of the character described comprising spaced runners which remain in ground contact during loading and unloading, a curved arm pivotally mounted on the runners adjacent one end thereof, spaced means for securing the curved arms together, upright means mounted adjacent the opposed ends of the runners to which the arms are secured, members securing the arms together, and means extending from the upright members to one of the said cross members securing the runners together, and means extending from one of the said cross members securing the runners together for latching the arms in the raised position, and means normally held in the raised position for preventing movement of the runners.

JOHN L. BUDREAU.

REFERENCES CITED

The following references are of record in the file of this patent:

UNITED STATES PATENTS

| Number | Name | Date |
|---|---|---|
| 947,964 | Collins | Feb. 1, 1910 |
| 972,478 | Shafto | Oct. 11, 1910 |
| 1,210,393 | Amman | Jan. 2, 1917 |
| 2,319,456 | Hazen | May 18, 1943 |
| 2,341,945 | Rabon | Feb. 15, 1944 |
| 2,375,205 | Barras | May 8, 1945 |
| 2,417,560 | McNamara, Jr. | Mar. 18, 1947 |
| 2,418,251 | Drott | Apr. 1, 1947 |